United States Patent Office 3,704,287
Patented Nov. 28, 1972

3,704,287
HIGH TEMPERATURE REDUCED CATALYST
AND PROCESS
Robert Norman Johnson, Basking Ridge, N.J., assignor
to Union Carbide Corporation, New York, N.Y.
No Drawing. Filed Sept. 17, 1970, Ser. No. 73,184
Int. Cl. C08f 1/42, 3/06
U.S. Cl. 260—94.9 DA                                59 Claims

ABSTRACT OF THE DISCLOSURE

An improved catalyst useful for preparing high density olefin polymers in improved yields, and in some cases, with reduced swell properties, is prepared by depositing a chromate ester catalyst on activated silica and then treating the resulting composition with selected organo-metallic reducing agents at elevated temperatures.

BACKGROUND OF THE INVENTION (No. 1) Field of the invention

The invention relates to the catalytic polymerization of olefin monomers.

(No. 2) Description of the prior art

U.S. 3,324,095, U.S. 3,324,101 and U.S. 3,642,749 all disclose the use of various chromate ester compounds as catalysts for the polymerization of olefin monomers, i.e., silyl chromate esters and hindred ditertiary polyalicyclic chromate esters. Many of these chromate ester compounds are disclosed as being used on activated inorganic oxide supports and, optionally, after being treated with various organometallic reducing agents.

Although the productivity of these catalysts is relatively high, that is, about 150 parts by weight of polymer may be obtained therewith per part by weight of supported catalyst, various attempts have been made to increase the productivity of the catalyst for obvious commercial reasons. Moreover, one of the more important end use applications for polyolefins, such as high density polyethylene, has been in the production of blow molded bottles. The high density polyethylenes which are to be used in such applications should have reduced swell properties.

In the field of blow molding bottles and the like, there exists a phenomenon called "polymer swell." Certain polymers, including the polymers heretofore produced with chromate ester catalysts, show a distinct tendency to expand upon extrusion. This tendency, which is related to molecular properties, causes the production of overweight products when used in conventional blow molding apparatus. Since overweight products represent a lower unit productivity per pound of polymer, it was appreciated that polymers made with chromate ester catalysts would find only limited acceptance in more conventional blow molding apparatus.

Any attempt at improving on the productivity of the chromate ester type catalyst, therefore, should also be such as to not interfere with the utility of the resulting polymers for the intended end use applications and, if possible, should also result in an improvement in the properties, such as the reduced swell properties, of such polymers.

Prior to the present invention it has not been possible to provide an improved chromate ester based catalyst which would provide improved yields in polymer produced therewith as well as an improvement in physical properties such as reduced swell in such polymers.

SUMMARY OF THE INVENTION

It has now been found that the productivity of supported chromate ester catalysts for the polymerization of ethylene and other olefin monomers may be substantially improved, while also leading, in some cases, to the production of polymers having improved reduced swell properties, if the chromate ester compound is used on a specific inorganic oxide support and the supported catalyst is reduced with specific organo metal reducing agents at elevated temperatures.

An object of the present invention is to provide a means for improving the olefin polymer productivity of supported chromate ester catalysts, while also providing, in some cases, polymers made with such catalysts which would have improved reduced swell properties.

DESCRIPTION OF THE PREFERRED EMBODIMENT

It has now been found that the productivity of supported and reduced chromate ester catalysts in the polymerization of olefin monomers may be readily and substantially improved, while also providing for an improvement, in some cases, in the reduced swell properties of the polymers produced therewith, if the supported catalysts are reduced at elevated temperatures with certain specific organometallic reducing agents.

The catalysts prepared according to the present invention may produce about 300 parts by weight of polymer per part by weight of the composite catalyst.

THE CHROMATE ESTERS

The chromate ester compounds which may be used as catalysts in the present invention have, in their structure, one or more groups of the formula:

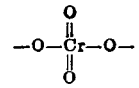

These chromate esters include silyl chromate ester compounds, hindered ditertiary polyalicyclic chromate esters and phosphorus containing chromate esters as noted below.

The silyl chromate compounds employed herein are characterized by having one or more groups of the formula:

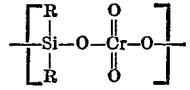

wherein R can be any hydrocarbyl group having from 1 to about 14 carbon atoms. Among the preferred compnuds containing said group are the bistrihydrocarbylsilylchromates of the formula:

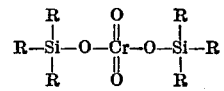

wherein R is any hydrocarbyl group containing from 1 to about 14 carbon atoms, preferably from about 3 to about 10 carbon atoms. Illustrative thereof are methyl, ethyl, propyl, iso-propyl, iso-butyl, n-pentyl, isopentyl hexyl, 2-methyl-pentyl, heptyl, octyl, 2-ethylhexyl, nonyl, decyl, dodecyl, tridecyl, tetradecyl, benzyl, phenethyl, p-methylbenzyl, phenyl, tolyl, xylyl, naphthyl, ethylphenyl, methylnaphthyl, dimethylnaphthyl, and the like. Examples of the preferred silyl chromate compounds are such compounds as:

Bis-trimethylsilyl chromate
Bis-triethylsilyl chromate
Bis-tributylsilyl chromate
Bis-triisopentylsilyl chromate
Bis-tri-2-ethylhexylsilyl chromate
Bis-tridecylsilyl chromate
Bis-tri(tetradecyl)silyl chromate Bis-tribenzylsilyl chromate
Bis-triphenethylsilyl chromate
Bis-triphenylsilyl chromate
Bis-tritolylsilyl chromate
Bis-trixylylsilyl chromate
Bis-trinaphthylsilyl chromate
Bis-triethylphenylsilyl chromate
Bis-trimethylnaphthylsilyl chromate
Polydiphenylsilyl chromate
Polydiethylsilyl chromate and the like.

While both the aryl- and alkyl-substituted silyl chromates can be used, it is to be noted that the aryl-silyl chromates are more stable. The alkylsilyl chromates, because of their instability and in some instances because they may be spontaneously explosive, should be handled with extreme caution and preferably in solution or in an inert atmosphere, or both.

The bis-triaromatic silyl chromates also have the advantageous property of being able to be handled in the presence of atmospheric moisture for periods of up to several hours.

The di-tertiary polyalicyclic chromate esters used in the practice of this invention are, generally, esters of tertiary bridged polyalicyclic alcohols and have the general formula:

$$R°-O-\overset{O}{\underset{O}{\overset{\|}{Cr}}}-O-R'$$

wherein R° and R' are similar or dissimilar hindered polyalicyclic groups which contain two or more saturated rings which are sterically hindered by the presence of bridged ring structures.

The hindered di-tertiary polyalicyclic chromate esters of the present invention may be prepared by reacting the corresponding alcohol or alcohols with chromium trioxide in a non-reductive, non-solvolytic solvent for the chromate ester. Suitable solvents include the more common saturated hydrocarbons, aromatic hydrocarbons, ethers, esters, ketones and the like, all of which are normally inert to the chromate esters. The reaction is preferably carried out under a dry inert atmosphere at temperatures of from about −100° to about 150° C. and has been found to proceed rapidly, resulting in highly stable, readily soluble esters.

Examples of the alcohols which may be used to form the hindered di-tertiary polyalicyclic esters are

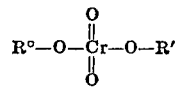

1-adamantanol

2-alkyl-2-borneol

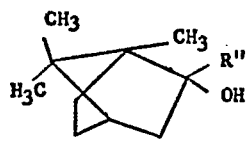

2-alkyl-2-fenchol

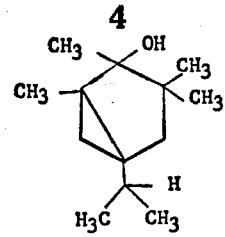

3,3,5-trimethyl-2-thujanol

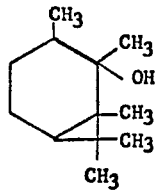

2,3-dimethyl-3-caranol

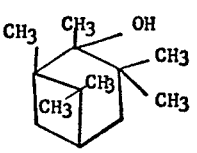

1,3,3-trimethyl-2-pinol

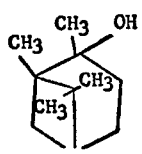

1-methyl-2-pinol

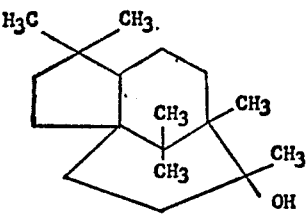

2,13,13-trimethyl-2-clovanol

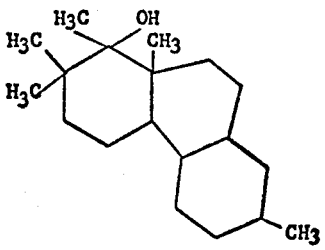

perhydro-1,3,3-trimethyl-2-pimanthrol

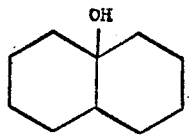

9-decanol

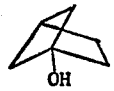

bicyclo(2.2.1)heptanol-1

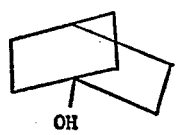

bicyclo(2.2.2)octanol-1

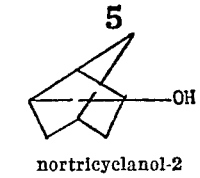

nortricyclanol-2

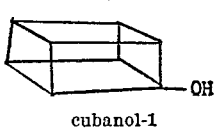

cubanol-1 wherein R″ is a $C_1$ to $C_4$ alkyl group, and similar hindered tertiary alcohols.

Reaction with chromium trioxide leads to the formation of highly stable tertiary esters resulting from an alicyclicalkyl juncture or an alicyclic bridgehead.

The di-2-alkyl bornyl and di-2-alkyl fenchyl chromate esters, for instance, may be used to illustrate an alicyclicalkyl juncture. Di-2-alkyl bornyl chromate esters have the general structure. (I)

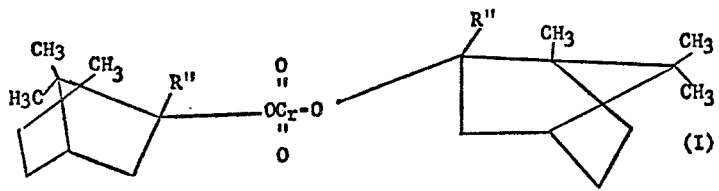

wherein R″ is a $C_1$ to $C_4$ alkyl group, while di-2-alkyl fenchyl chromate esters have the general structure. (II)

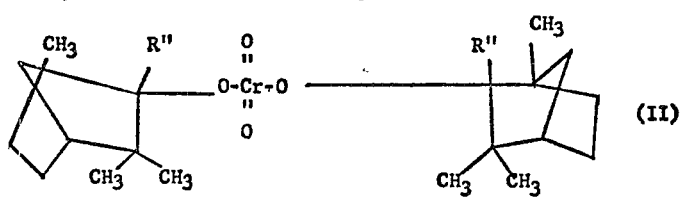

wherein R″ is a $C_1$ to $C_4$ alkyl group.

Adamantyl chromate (III) serves as a good illustration for alicyclic bridgehead linkage.

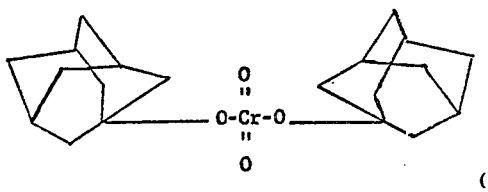

Quite unlike simpler esters like di-t-butyl chromate (IV)

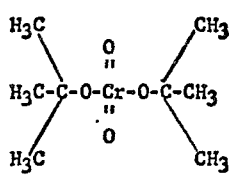

which are highly unstable and potentially explosive, these sterically hindered esters are extremely stable. While not wishing to be bound by theory, it is postulated that Bredt's Rule concerning bridged structures holds in substantiating their stability as compared to the unhindered chromate esters.

The hindered di-tertiary polyalicyclic chromate esters, however do not appear to inherently possess catalytic activity for olefins but must be supported on an inorganic oxide base and suitably treated with an organometallic compound.

Other chromate esters which may be used in the present invention include various phosphorous containing chromate esters. The phosphorous containing chromate ester compounds that may be employed herein are characterized by the formula:

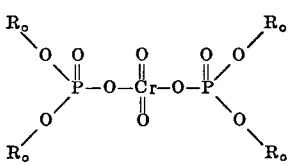

wherein the $R_o$'s may be the same or different and are $C_1$ to about $C_{10}$ hydrocarbon radicals. Among the preferred of such phosphorous containing chromate ester compounds are those in which $R_o$ is an aryl radical such as tolyl and phenyl. The use of these phosphorous containing chromate esters as olefin polymerization catalysts is disclosed in U.S. 3,474,080.

THE REDUCING AGENTS

The organometallic reducing agents which are used with the supported chromate ester catalysts of the present invention have the structure $$M(R_1')_a(R_2'')_b$$

wherein M is a metal selected from the group consisting of aluminum, gallium and magnesium.

$R_1'$ is a saturated or unsaturated hydrocarbon group containing from 1 to about 20 carbon atoms, for instance, an alkyl, alkenyl, aryl, aralkyl, cycloalkyl or alkaryl group, such as methyl, ethyl, n-propyl, isopropyl, n-butyl, heptyl, hexyl, cycloheptyl, cyclohexyl, allyl, propenyl, phenyl, and naphthyl benzyl, $R_2''$ is $R_1'$ or H $a$ is a whole number of 1 to 3, inclusive, and $b$ is a whole number of 0 to 2, inclusive, with the proviso that $a+b=$ the valence of M.

Specific examples of such reducing agents include trialkyl aluminum compounds such as trimethyl aluminum, triethyl aluminum and triisobutyl aluminum, dialkyl aluminum hydrides such as dimethyl aluminum hydride, diethyl aluminum hydride and methyl-ethyl aluminum hydride, trialkyl gallium compounds such as trimethyl gallium, triethyl gallium, and triisobutyl gallium and dialkyl magnesium compounds such as dimethyl magnesium, diethyl magnesium, and methylethyl magnesium.

The preferred of such reducing agents are the trialkyl or triaryl aluminum compounds because polymers can be made with such reducing agents in higher yields, and such polymers will have higher melt index and lower die swell properties than when other reducing agents are used. Such polymers, therefore, tend to be more commercially useful for blow molding applications, for which the polymers should preferably have melt index values of about 0.2 to 1.0 and die swell values of about 2.00 to 2.60 at a shear rate of 158 sec.$^{-1}$.

INORGANIC OXIDE SUPPORT

The catalyst species, as noted above, comprises a chromate ester deposited in an inorganic oxide support. About 0.001 to 10% or more by weight of the chromate ester compound is used on the support based on the combined weight of the chromate ester compound and the inorganic oxide support. The support is loaded as much as possible with the chromate ester. The amount of the chromate ester compound which can be used on the support varies depending on the particular support being used and the activation temperature of such support.

The inorganic oxide materials which are to be used as a support for the chromate esters in accordance with the present invention are silicon dioxide materials having a high surface area, that is, a surface area in the range of about 50 to about 1,000 square meters per gram.

Because the chromate esters are sensitive to moisture, the catalyst support should be completely dried before it is brought into contact with the organo-chromium compound. This is normally done by simply heating or predrying the catalyst support with an inert gas prior to use. It has been found that the temperature of drying has an appreciable effect on the relative productivity of the catalyst system and on the molecular weight distribution and the melt index of the polymer produced.

Drying or activation of the support can be accomplished at nearly any temperature up to about its sintering temperature for a period of time which is at least sufficient to remove the adsorbed water from the support while at the same time avoiding such heating as will remove all of the chemically bound water from the support. The passage of a stream of dry inert gas through the support during the drying aids in the displacement of the water from the support. Drying temperatures of from about 200° C. to 1000° C. for a short period of about six hours or so should be sufficient if a well dried inert gas is used, and the temperature is not permitted to get so high as to completely remove the chemically bound hydroxyl groups on the surface of the support.

Any grade of support can be used but microspheroidal intermediate density (MSID) silica having a surface area of 258 square meters per gram and a pore diameter of about 288 A., and intermediate density (ID) silica having the same area but a pore diameter of 164 A. are preferred. Other grades such as the G–968 silica, as designated by W. R. Grace and Co., and having a surface area af 700 square meters per gram, and a pore diameter of 50–70 A. is also quite satisfactory. Variations in melt index control and in polymer productivity can be expected between different grades of supports.

The supported catalysts can be prepared by a slurry technique where the selected and properly dried support is added under conditions which exclude the presence of air and moisture to a solution containing the chromate ester and solvent to form a slurry. The slurry may be stirred for a period of up to about 4 hours to obtain good adsorption of the chromate ester on the support. The solvent is then drained from the slurry and the catalyst used as such or the retained solvent can be evaporated under conditions which exclude oxygen and moisture to yield a dry, powdery supported catalyst.

The dry supported catalyst may also be conveniently prepared in the absence of solvent by direct vapor deposition (sublimation) of the selected chromate ester onto a dry support. This may be simply and conveniently accomplished by blending the chromate ester compound and support under a dry, inert atmosphere, and then reducing the pressure to cause the chromate ester to sublime and adsorb onto the support.

COMPOSITE CATALYSTS

The composite catalysts of the present invention, as noted above, are prepared from the above described reducing agents and the silicon dioxide supported chromate ester compounds.

The composite catalyst comprises about 0.75 to 6 weight percent of the reducing agent and about 94.0 to 99.25 weight percent of the inorganic oxide supported chromate ester. About 2 to 16 mols of the organometallic reducing agent are used per mol of the chromate ester. The reducing agent is used in such amounts as to provide the reduced chromium atoms in the composite catalyst with an average valence of $\cong 2.0 < 4.0$.

The chromate ester should be added to the silicon dioxide support before the organometallic reducing agent is brought into contact with the chromate ester. The reduction of the chromate ester compounds with the organometallic reducing agent is conducted at elevated temperatures of the order of at least 50° C. up to the decomposition temperature of the particular chromate ester being employed. In the case of the ditertiary polyalicyclic chromate esters, the preferred reduction reaction temperatures are in the order of about 125 to 200° C., and in the case of the silyl chromate esters and the other esters, the preferred reduction reaction temperature is of the order of about 125 to 150° C.

The reduction reaction is preferably conducted in solution in a relatively high boiling organic solvent in which the organometallic reducing agent is soluble. The reduction reaction occurs practically instantaneously and requires only about one to three minutes depending on the amount of catalyst being reduced and the temperature being employed in the reaction.

Suitable solvents which may be used in the reduction reaction include n-nonane (B.P. 151° C.), n-decane (B.P. 174° C.), n-undecane (B.P. 196° C.), and n-dodecane (B.P. 215° C.).

Care should be taken to avoid having moisture or air contact the composite catalyst after it is prepared. The reagents used in preparing the composite catalyst should also be free of moisture, air, or other catalyst poisons.

About 0.02 to 0.2 weight percent of the composite catalyst is used per mol of monomer being polymerized. The amount of catalyst being employed may vary depending on the type polymerization procedure being employed.

The unobviousness of the enhanced activity of the catalyst of the present invention is evidenced by the facts that:

(a) The use of other reducing agents commonly employed with olefin polymerization catalyst, other than those employed in the present invention, such as diethyl zinc, triethyl borane, and aluminum alkoxide compounds, even at elevated reducing temperatures, does not enhance the properties of the resulting catalysts or of the products made therewith, and in some instances, such as in the case of the aluminum alkoxide compounds, the activity of the catalyst appears to be diminished somewhat.

(b) A choice of support is also important. Inorganic oxide supports other than silicon dioxide, such as silica-alumina, do not provide improved yields with the use of the elevated reducing temperatures.

(c) Poor results are obtained even when the reducing agents of the present invention are used with a silicon dioxide support and the chromate ester catalysts, if the support alone is treated at elevated temperatures with the reducing agent before the chromate ester is added to the support.

THE MONOMERS

The monomers which are used in the monomeric charge being polymerized in accordance with the present invention may be one or more alpha-olefins containing 2 to about 8, inclusive, carbon atoms. The monomers may be mono-olefins or di-olefins.

The mono-olefins would include ethylene, propylene, butene-1, pentene-1, 3-methylbutene-1, hexene-1, 4-methylpentene - 1, 3 - ethyl-butene - 1, heptene - 1, octene - 1, decene-1, 4,4-dimethylpentene-1, 4,4-diethylhexene-1, 3,4-dimethylhexene-1, 4-butyl-1-octene, 5-ethyl-1-decene, 3,3-dimethyl-butene-1, and the like. Among the diolefins which may be used are butadiene, 1,5-hexadiene, dicyclopentadiene, ethylidene norbornene, and the like.

THE POLYMERS

The solid polymers which are prepared in accordance with the teachings of the present invention include materials which have densities of about 0.940 to 0.965, inclusive, melt indexes of up to about 1.7, and catalyst residue contents of ≤three parts per million, calculated as chromium.

The preferred polymers are polymers of ethylene, homopolymers and interpolymers. The most preferred polymers are homopolymers of ethylene and copolymers containing at least 50% by weight of ethylene and up to 50% by weight of one or more other mono- and/or diolefins which may be interpolymerized therewith.

THE POLYMERIZATION REACTION

After the composite catalysts have been formed, the polymerization reaction is conducted by contacting the monomer charge, and substantially in the absence of catalyst poisons, with a catalytic amount of the catalyst at a temperature and at a pressure sufficient to initiate the polymerization reaction. If desired, an inert organic solvent may be used as a diluent and to facilitate materials handling.

The polymerization reaction is carried out at temperatures of from about 30° C. or less up to about 200° C. or more, depending to a great extent on the operating pressure, the pressure of the entire monomer charge, the particular composite catalyst being used and its concentration. Naturally, the selected operating temperature is also dependent upon the desired polymer melt index since temperature is definitely a factor in adjusting the molecular weight of the polymer. Preferably, the temperature is from about 30° C. to about 100° C. in the conventional slurry or "particle forming" technique and from 100° C. to 200° C. in "solution forming." The control of temperature in this process is desirable as hereinafter more fully described in providing various effects upon molecular weight of the polymers as well as in controlling the phase in which they are made. As with most catalyst systems, higher polymerization temperatures produce lower weight average molecular weight polymers, and consequently of higher melt index.

The pressure can be any pressure sufficient to initiate the polymerization of the monomer to the desired polymer and can be carried out from subatmospheric pressure, using an inert gas as a diluent, to superatmospheric pressure of up to about 1,000,000 p.s.i.g. (pounds per square inch gauge), or more, but the preferred pressure is from atmospheric up to about 1000 p.s.i.g. As a general rule, a pressure of 20 to 800 p.s.i.g. is preferred.

When an inert organic solvent medium is employed in this invention it should be one which is inert to all the other components and products of the reaction system and be stable at the reaction conditions being used. It is not necessary, however, that the inert organic solvent medium also serve as a solvent for the polymer produced. The inert organic solvents which may be used include saturated aliphatic hydrocarbons, such as hexane, heptane, pentane, isooctane, purified kerosene and the like, saturated cycloaliphatic hydrocarbons, such as cyclohexane, cyclopentane, dimethylcyclopentane and methylcyclohexane and the like, aromatic hydrocarbons such as benzene, toluene, xylene, and the like and chlorinated hydrocarbons, such as chlorobenzene, tetrachloroethylene, ortho-dichlorobenzene, and the like. Particularly preferred solvent media are cyclohexane, pentane, hexane and heptane.

When it is preferred to conduct the polymerization to a high solids level as hereinbefore set forth, it is, of course, desirable that the solvent be liquid at the reaction temperature. For example, when operating at a temperature which is lower than the solution temperature of the polymer in the solvent, the process can be essentially a slurry or suspension polymerization process in which the polymer actually precipitates out of the liquid reaction medium and in which the catalyst is suspended in a finely divided form.

This slurry system is of course dependent upon the particular solvent employed in the polymerization and the solution temperature of the polymer prepared. Consequently, in the "particle form" embodiment, it is most desirable to operate at a temperature which is lower than the normal solution temperature of the polymer in the selected solvent. For example, polyethylene prepared herein may have a solution temperature in cyclohexane of about 90° C., whereas in pentane its solution temperature may be about 110° C. It is characteristic of this "particle form" polymerization system that a high polymer solids content is possible even at low temperatures, if sufficient agitation is provided so that adequate mixing of the monomer with the polymerizing mass can be accomplished. It appears that while the polymerization rate may be slightly slower at the lower temperatures, the monomer is more soluble in the solvent medium, thus counteracting any tendency to low polymerization rates and/or low yields of polymer.

It is also characteristic of the slurry process that the monomer appears to have substantial solubility characteristics even in the solids portion of the slurry so that as long as adequate agitation is provided, and the polymerization temperature is maintained, a broad range of size of solid particles in the slurry can be provided. Experience has shown that the slurry technique can produce a system having more than a fifty percent solids content, provided sufficient fluidizing conditions and agitation are maintained. It is particularly preferable to operate the slurry process in the range of 30–40 weight percent of polymer solids.

Recovery of the polymer from the solvent medium is, in this embodiment, reduced to a simple filtration and drying operation and no efforts need be expended in polymer clean up and catalyst separation or purification. The residual concentration of catalyst in the polymer is so small, that generally no more than about 1 part of chromium per million parts of polymer can be achieved, and at such levels they are innocuous and unnoticed in the polymer. Expeditiously, they can be left in the polymer.

Operating at temperatures higher than the solution temperature of the polymer in the selected solvent medium also can produce a high polymer solids content in a solution polymerization procedure. The temperature in this type of polymerization system must be sufficiently high to enable the solvent being used to dissolve at least 25–30 pecent by weight of the polymer being produced. On the other hand, the temperature must be sufficiently low to avoid thermal destruction of the formed polymer and the particular catalyst employed. In general, for the various solvents and catalysts used, temperatures within the range of about 100° C. to about 200° C. and preferably about 120° C. to about 170° C. have been found to be generally optimum for the practice of such solution polymerization procedure. However, the particular polymer being produced also has a significant effect on the optimum polymerization temperature. For example, ethylene-propylene copolymers which may be produced by this process may be soluble in many of these organic solvents at low temperatures and hence the use of such temperatures is permissible in this invention even though such temperatures may not be desired for optimum production of ethylene homopolymers.

Solvents constitute one of the most significant and vexing sources of catalyst poisoning. Moreover, in most prior solution polymerization processes employing transition metal-containing catalysts, the use of large quantities of solvent, i.e., a solvent-to-polymer ratio of the order of 20:1, was believed necessary. Such large proportions of solvent, necessarily, greatly increased the catalyst poisoning problem. In the present process, however, the proportion of solvent to polymer can be as low as 0.1:1 or even less, thereby maintaining a very high catalyst productivity and efficiency of the system.

When the solvent serves as the principal reaction medium, it is of course, desirable to maintain the solvent medium substantially anhydrous and free of any possible catalyst poisons such as moisture and oxygen, by redistilling or otherwise purifying the solvent before use in this process. Treatment with an absorbent material such as high surface area silicas, aluminas, molecular sieves and like materials are beneficial in removing trace amounts of contaminants that may reduce the polymerization rate or poison the catalyst during the polymerization reaction.

However, it is also possible to operate the polymerization reaction without an added solvent reaction medium, if desired. For example, a liquid monomer itself can be the reaction medium, as in making ethylene-propylene copolymers using commercially available liquefied propylene, or by operating under sufficient pressure that a normally gaseous monomer is liquefied.

The fact that the polymerization rate remains high even at the high viscosities encountered at high solids level, is unexpected. It is particularly surprising and unexpected that the reaction rate remains high when gaseous monomers such as ethylene are employed. I have found, however, that high polymerization rates are maintained even when using such gaseous monomers at pressures under 100 p.s.i.g. when the reaction solution is agitated by means of a high velocity, high shear stirrer, particularly one driven at speeds in excess of 2000 r.p.m. and designed to impart considerable shearing action on the solution.

Another particularly important advantage afforded by this aspect of the process is that the high solids content polymer solution, upon completion of the polymerization reaction, is, without any further treatment, suitable for polymer isolation, by milling techniques, such as those described in U.S. 2,434,707 to W. A. Marshall. The "Marshall mill" is operated most advantageously when the polymer-solvent mixture being treated is high in polymer content. The use of such an enclosed mill also permits the recycle of all or part of the separated solvent to the polymerization reactor without contact with oxygen or atmospheric water vapor which are destructive of many transition metal-containing catalysts.

Still another advantage of having the polymer soluble in the diluent is that high reaction temperatures can be employed. This is advantageous because the high temperatures reduce the viscosity of the solution, they also cause the polymerization to proceed faster, and allow more efficient removal of the heat of reaction because of the large temperature differential between the reactor and the cooling water, and also permit control of the polymer molecular weight since high reaction temperatures generally cause the formation of lower molecular weight polymer.

The separation of polymer from the solvent medium is not limited in this invention to the use of a high shear mill, although a Marshall mill has been found to be well suited for use herein and is preferred. However, it is also possible to employ precipitation and filtration techniques to recover the polymer, or to concentrate the polymer/solvent mass by flash evaporation or other means of solvent removal followed by high shear milling. A number of other suitable high shear mills are commercially available and, because of the low solvent content of the solution to be treated, other devices such as vented extruders, calendering roll mills, planetary rotor mills such as the one described in U.S. 3,075,747 to W. L. Calvert, Banbury mills, and the like, can also be successfully employed to accomplish isolation of the polymer product. By the term "high shear mill" as used hereinafter is meant a mill comprising parallel rolls having intermeshing threads, and the term "high shear conditions" and "conditions of high shear" means those conditions achieved on a high shear mill or by adequately powered high speed mixers for viscous materials.

It should be understood that the high solids system can be employed with the composite catalyst suspended in the solvent, provided that the necessary conditions of agitation, pressure, temperature, and the like are maintained so to provide contact of the monomer with the composite catalyst, and that the pressure and temperature are such as to initiate the polymerization of that monomer to the polymer.

By conducting the polymerization reaction in the presence of hydrogen, which appears to function as a chain transfer agent, the molecular weight of the polymer may be controlled.

Experience has shown that hydrogen may be used in the polymerization reaction in amounts varying between about 0.001 to about 10 moles of hydrogen per mole of olefin monomer. For most polymerization reactions, a narrow molecular weight distribution may be obtained by using from about 0.001 to about 0.5 mole of hydrogen per mole of monomer.

The polymerization of alpha olefins such as ethylene with the catalysts of this invention can also be conducted in a fluid bed process such as that disclosed in French Pats. 1,578,481 and 1,591,425.

The following examples are designed to merely illustrate the present invention and are not intended as a limitation upon the scope thereof.

The properties of the polymers produced in the examples were determined by the following test methods:

Density, ASTM D-1505—Plaque is conditioned for one hour at 120° C. to approach equilibrium crystallinity.

Melt index (MI), ASTM D-1238—Measured at 190° C.—reported as grams per 10 minutes.

Flow rate (HLMI), ASTM D-1238—Measured at 10 times the weight used in the melt index test above.

PREPARATION OF POLYALICYCLIC CHROMATES

Example A

To a 1,000 ml. Erlenmeyer flask equipped with a condenser and magnetic stirrer there was added at 55° C., 216 grams of carbon tetrachloride, 6.7 grams of dry magnesium sulfate, 20 grams (0.131 mole) of 1-adamantanol and 10 grams (0.1 mole) of chromic oxide, with the chromium trioxide being added incrementally to control foaming. The mixture, which was dark, was stirred at 55° C. for 4 hours. To the resultant mixture there was added, with stirring, 3 grams of charcoal and 2 grams of an inert filter aid. The mixture was gravity filtered and the solids washed with carbon tetrachloride allowing the washings to combine with the main filtrate. The filtrate was then concentrated to a red syrup under vacuum at 50° C. and allowed to remain overnight at 20° C. in a vacuum oven. The dark brown solid that remained weighed 28.1 grams (theoretical yield of adamantyl chromate being 25.3 grams). To obtain further purification, 75 grams of carbon tetrachloride, 3 grams of charcoal and 2 grams of an inert filter aid was added to the solid and the mixture warmed slightly and filtered to give a bright red solution. After removal of carbon tetrachloride by vacuum evaporation, 22.6 grams of a bright orange solid having a melting point of 168° C. was obtained without decomposition. Carbon and hydrogen analysis revealed the following:

| Element | Calculated, percent | Found, percent |
| --- | --- | --- |
| Carbon | 62.3 | 62.25 and 62.16. |
| Hydrogen | 7.83 | 8.07 and 8.02. |

Infrared spectrum showed strong absorption at 10.4μ which was characteristic of the chromate ester group and at 10.8μ which was characteristic of the adamantyl group.

Examples 1-17

A series of 17 experiments were run in order to demonstrate that, in comparison to the use of a chromate ester supported catalyst prepared by prior art techniques, when a chromate ester catalyst is prepared in accordance with the present invention, a substantial improvement in yield is obtained in the preparation of olefin polymers. Table I below lists the tabular form the various components of the catalysts used in the experiments, i.e., chromate ester, reducing agent and support, the temperatures at which the support component was activated, the temperature at which the reducing reaction was conducted; polymerization conditions employed with such catalysts; and the results in terms of the properties and yield of polymer produced with the various catalysts evaluated.

PREPARATION OF THE CATALYSTS

The chromate esters used in the preparation of the catalysts were triphenyl silyl chromate, as representative of the silyl chromate esters, and adamantyl chromate, as an example of a polyalicyclic chromate ester. The silyl chromate esters were used in Examples 1–7 and 10–17 and the adamantyl chromate esters were used in Examples 8 and 9. The adamantyl chromate ester was prepared as disclosed in Example A above.

The silicon dioxide support used in the examples was intermediate grade (ID) silicon dioxide, with the exception of Example 8 wherein microspheroidal intermediate density (MSID) silica was used. These supports are activated at various temperatures and the temperatures are listed in Table I below.

The organometallic reducing agent used in the examples was triethyl aluminum (TEA) in Examples 1–9, diisobutyl aluminum hydride (i-Bu$_2$AlH) in Examples 10 and 11; triisobutyl aluminum (i-Bu$_3$Al) in Examples 12 and 13; diethylmagnesium (Et$_2$Mg) in Examples 14 and 15; and triethyl gallium (Et$_3$Ga) in Examples 16 and 17. The temperature at which the reduction reaction was conducted is also listed in Table I below. An indicated reduction temperature of 25° C. indicates that the reducing reaction was conducted at ambient temperatures.

Each of the catalysts species used in Examples 1–17 was prepared as follows: a reaction bottle was carefully charged with nitrogen to purge any air therefrom, and 25 milliliters of n-decane were then charged to the bottle. Then, either 10 mg. of the silyl chromate ester, or 7 mg. of the adamantly chromate ester, as the case may be, and 400 mg. of the activated support were charged to the bottle. The n-decane used in these experiments had been previously purified to remove water and other potential catalyst poisons therefrom either by treating it with sulfuric acid or Filtrol clay followed by drying over molecular sieves. After the deposition of the chromate ester on the activated support was complete, as evidenced by the disappearance of color in the solvent, the bottle containing the catalyst system was immersed to an oil bath previously heated to the desired reduction temperature, ±5° C. Where the reduction reaction was to be conducted at room temperature the bottle was not heated at all. After the bottle and contents had reached the desired reaction temperatures, 0.5 ml. of a 0.5 M solution of the reducing agent in decane solution was rapidly added with efficient stirring to the supported chromate ester slurry. The resulting reduced catalyst slurry was then cooled, where necessary, to ambient temperatures, and the resulting reduced catalyst was then used in the polymerization reactions as disclosed below. Equivalent results were obtained by preparing a slurry of the supported chromate ester in hexane, removing the hexane under vacuum at ambient temperatures followed by the addition of the dry supported chromate ester to 25 ml. of the decane containing the required amount of the reducing agent at the desired reducing temperature.

POLYMERIZATION REACTIONS

The polymerization reactions using the catalysts prepared as noted above were conducted by homopolymerizing ethylene in all of the examples except Example 7 wherein a small amount of butene, about 6.8 grams, was copolymerized with ethylene using the above described catalyst. The reactions were conducted for the most part at 90° C., with the exception of Example 8 wherein the reaction was conducted at 92° C., and in Example 12 wherein the reaction was conducted at 85° C. In some cases hydrogen was used, in the amounts indicated in Table I below in pounds per square inch of pressure, as a molecular weight control agent. The amount of ethylene used was sufficient to provide a total of 200 pounds per square inch pressure in all of the examples except Example 12 wherein the total pressure was 300 p.s.i., taking into account the amount of hydrogen, where used. The reactions in each case were conducted for 60 minutes under slurry conditions in 500 cc. of hexane. The resulting polymeric products were recovered from the slurry by filtration and solvent evaporation.

POLYMER PRODUCT

The polymer produced in each of Examples 1–17 is characterized in the table below in terms of its melt index (MI), or its high load melt index (HLMI). The notation NF indicates that the melt index was so low that no flow resulted during the tests. Density (DENS) is reported in some cases, and the yield is reported in grams of polymer produced per hour of polymerization time. The yields listed in Table I below thus show that improvements in yields of the order of 2 to over 10 times may be obtained by using the reducing agents of the present invention at elevated reducing temperatures without deleteriously effecting the physical properties of the resulting polymers.

TABLE I.—POLYMER YIELD, HIGH VERSUS LOW TEMPERATURE REDUCTION

| Example | Chromate ester | Cocatalyst reducing agent | Support act. T., °C. | Reduction temp. | $H_2$, p.s.i. | MI | HLMI | DENS | Yield, g./hr. |
|---|---|---|---|---|---|---|---|---|---|
| 1 | Silyl | Tea | 340 | 25 | 0 | NF | 1.0 | 0.96 | 60 |
| 2 | do | Tea | 340 | 150 | 0 | NF | 1.0 | 0.96 | 160 |
| 3 | do | Tea | 340 | 25 | 50 | 0.04 | 7.1 | 0.96 | 69 |
| 4 | do | Tea | 340 | 150 | 50 | 0.18 | 18 | 0.96 | 135 |
| 5 | do | Tea | 340 | 100 | 50 | 0.09 | 11 | 0.96 | 100 |
| 6 | do | Tea | 340 | 75 | 50 | 0.10 | 14 | | 96 |
| 7 | do | Tea | 435 | 150 | 50 | 0.6 | 46 | 0.947 | 150 |
| 8 | Admantyl | Tea | 350 | 25 | 0 | NF | 0.5 | | 31 |
| 9 | do | Tea | 440 | 150 | 50 | 0.29 | 27 | | 155 |
| 10 | Silyl | i-BU$_2$ALH | 450 | 25 | 50 | 0.08 | 14 | | 67 |
| 11 | do | i-BU$_2$ALH | 450 | 150 | 50 | 0.01 | 2.4 | | 91 |
| 12 | do | i-BU$_3$AL | 340 | 25 | 50 | 0.02 | 6.6 | | 58 |
| 13 | do | i-BU$_3$AL | 450 | 150 | 50 | 0.11 | 15.3 | | 110 |
| 14 | do | ET$_2$mg | 340 | 25 | 0 | NF | 1.2 | | 9 |
| 15 | do | ET$_2$mg | 340 | 150 | 50 | NF | 2.0 | | 120 |
| 16 | do | ET$_3$GA | 340 | 25 | 0 | NF | 0.2 | | 10 |
| 17 | do | ET$_3$GA | 340 | 150 | 0 | NF | 0.6 | | 120 |

Examples 18–19

Two experiments were conducted to demonstrate the use of a trialkyl aluminum reducing agent, triethyl aluminum, for the purposes of preparing polymers having improved die swell properties, in accordance with the teachings of the present invention. The chromate ester used in these two experiments was triphenyl silyl chromate. The support used was intermediate grade (ID) silicon dioxide which was activated at 340° C.

The two catalysts used in these two experiments were each prepared as in Examples 1–17 from 10 mg. of the chromate ester, 400 mg. of the support and 0.24 mmoles of the reducing agent. The catalyst used in one of these experiments was reduced at 25° C. and the other was reduced, in accordance with the present invention, at 150° C.

Each of the catalysts were then used to homopolymerize ethylene. The polymerization reactions were conducted as in Examples 1–7 in 500 ml. of hexane under slurry conditions at a temperature of 90° C. and under a hydrogen presure of 50 p.s.i. and a total pressure of 200. Each of the reactions was conducted for 60 minutes. The resulting polymer was recovered from the slurry by filtration and solvent evaporation.

Table II below lists the reduction temperature used for each of the catalysts, the yield of polymer produced in each experiment (in grams/hour), and the melt index, high load melt index and die swell properties of the resulting polymers.

Th results of these experiments demonstrate that the high temperature reduction of the chromate ester with a trialkyl aluminum compound, such as triethyl aluminum, leads to the preparation, in substantially improved yields, of polymers having improved die swell properties.

The test procedure used to evaluate the die swell of a polymer involves a measurement of the swell of the polymer under constant shear conditions. In this procedure, aproximately 50 grams of compacted polymer are charged to a barrel heated to 190° C., and the polymer is extruded from the barrel through a regular flat melt index type of die, but having a length/diameter ratio of 30 instead of 4, at shear rates of 76 and 158 seconds$^{-1}$. Extrudates of about an inch in length are then immersed in a silicone oil bath heated at 150° C. until the equilibrium swell is reached, which is usually about after 20 minutes. The swell of the polymer (expressed as the swell ratio, i.e., the ratio of the diameter of the extrudate to the diameter of the die) is then calculated by using the following equation:

Swell Ratio=$12.97$ $(0.08051\ W/L)^{\frac{1}{4}}$ wherein

W=weight of polymer sample (in grams)
L=length of polymer sample (in inches)

TABLE II

| Example | Reduction temp., °C. | Yield, gr./hr. | MI | HLMI | Swell ratio 76 sec.$^{-1}$ | 158 sec.$^{-1}$ |
|---|---|---|---|---|---|---|
| 18 | 25 | 70 | 0.07 | 12.2 | 2.55 | 2.75 |
| 19 | 150 | 130 | 0.40 | 34 | 2.41 | 2.57 |

What is claimed is:

1. In a process for polymerizing a monomer charge comprising at least 50% by weight of ethylene and up to 50% by weight of at least one other alpha olefin by contacting said charge with silicon dioxide supported chromate ester catalyst, the improvement which consists essentially of reducing said catalyst prior to said contact and at a temperature of from about 50° C. up to the decomposition temperature of said chromate ester so as to provide the reduced chromium atoms in the composite catalyst with an average valence of ≥2.0<4.0, said reducing being accomplished with about 2 to 16 mols per mol of said chromate ester of at least one organometallic compound having the structure $$M(R'_1)_a(R''_2)_b$$

wherein
M is a metal selected from the group consisting of aluminum, magnesium and gallium,
$R'_1$ is a $C_1$ to $C_{20}$ hydrocarbon radical,
$R''_2$ is $R'_1$ or H,
$a$ is a whole number of 1 to 3, inclusive, and
$b$ is a whole number of 0 to 2, inclusive, with the proviso that $a+b=$the valence of M.

2. A process as in claim 1 in which said chromate ester comprises silyl chromate ester.

3. A process as in claim 2 in which said silyl chromate ester comprises a compound which contains at least one group of the structure

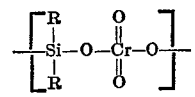

wherein R is a $C_1$ to $C_{14}$ hydrocarbon radical.

4. A process as in claim 3 wherein R is an aryl radical.
5. A process as in claim 4 wherein said silyl chromate ester is a bis-triaryl silyl chromate.
6. A process as in claim 5 wherein said silyl chromate ester is bis-triphenyl silyl chromate.
7. A process as in claim 5 wherein said monomer charge consists of ethylene.
8. A process as in claim 7 wherein M is aluminum.
9. A process as in claim 8 wherein $R'_1$ and $R''_2$ are alkyl radicals.
10. A process as in claim 9 wherein said organometallic compound comprises triethyl aluminum.
11. A process as in claim 9 wherein said organometallic compound comprises triisobutyl aluminum.
12. A process as in claim 8 wherein $R'_1$ is an alkyl radical and $R''_2$ is H.
13. A process as in claim 12 wherein said organometallic compound comprises diisobutyl aluminum hydride.
14. A process as in claim 7 wherein M is magnesium.
15. A process as in claim 14 wherein $R'_1$ and $R''_2$ are alkyl radicals.
16. A process as in claim 15 wherein said organometallic compound comprises diethyl magnesium.
17. A process as in claim 7 wherein M is gallium.
18. A process as in claim 17 wherein $R'_1$ and $R''_2$ are alkyl radicals.
19. A process as in claim 18 wherein said organometallic compound comprises triethyl gallium.
20. A process as in claim 1 in which said chromate ester comprises a hindered di-tertiary polyalicyclic chromate ester.
21. A process as in claim 20 in which chromate ester comprises a compound which has the structure

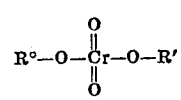

wherein R° and R′ are similar or dissimilar hindered polyalicyclic groups which contain two or more saturated rings which are sterically hindered by the presence of bridged ring structures.

22. A process as in claim 21 wherein R° and R′ are the same polyalicyclic groups.
23. A process as in claim 22 wherein R° and R′ are adamantyl groups.
24. A process as in claim 23 wherein said monomer change consists of ethylene.
25. A process as in claim 24 wherein M is aluminum.
26. A process as in claim 25 wherein $R'_1$ and $R''_2$ are alkyl radicals.
27. A process as in claim 26 wherein said organometallic compound comprises triethyl aluminum.

28. A polymerization catalyst which consists essentially of silicon dioxide supported chromate ester reduced at a temperature of from about 50° C. up to the decomposition temperature of said ester so as to provide the reduced chromium atoms in the composite catalyst with an average valence of $\geq 2.0 < 4.0$, said reducing being accomplished with about 2 to 16 mols per mol of said chromate ester of reducing agent having the structure $$M(R'_1)_a(R''_2)_b$$

wherein

M is a metal selected from the group consisting of aluminum, magnesium and gallium, $R'_1$ is a $C_1$ to $C_{20}$ hydrocarbon radical, $R''_2$ is $R'_1$ or H, $a$ is a whole number of 1 to 3, inclusive, and $b$ is a whole number of 0 to 2, inclusive, with the proviso that $a+b=$ the valence of M.

29. A catalyst as in claim 28 in which said chromate ester comprises a silyl chromate ester.

30. A catalyst as in claim 29 in which said silyl chromate ester comprises a compound which contains at least one group of the structure

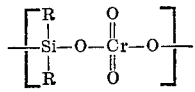

wherein R is a $C_1$ to $C_{14}$ hydrocarbon radical.

31. A catalyst as in claim 30 in which R is an aryl radical.

32. A catalyst as in claim 31 in which said silyl chromate ester is a bis-triaryl silyl chromate.

33. A catalyst as in claim 32 in which said silyl chromate ester is bis-triphenyl silyl chromate.

34. A catalyst as in claim 33 in which M is aluminum.

35. A catalyst as in claim 34 in which $R'_1$ and $R''_2$ are alkyl radicals.

36. A catalyst as in cliaim 35 in which said organometallic compound comprises triethyl aluminum.

37. A catalyst as in claim 35 in which said organometallic compound comprises triisobutyl aluminum.

38. A catalyst as in claim 34 in which $R'_1$ is an alkyl radical and $R''_2$ is H.

39. A catalyst as in claim 38 in which said organometallic compound comprises diisobutyl aluminum hydride.

40. A catalyst as in claim 33 in which M is magnesium.

41. A catalyst as in claim 40 in which $R'_1$ and $R''_2$ are alkyl radicals.

42. A catalyst as in claim 41 in which said organometallic compound comprises diethyl magnesium.

43. A catalyst as in claim 33 in which M is magnesium.

44. A catalyst as in claim 43 in which $R'_1$ and $R''_2$ are alkyl radicals.

45. A catalyst as in claim 44 in which said organometallic compound comprises diethyl magnesium.

46. A catalyst as in claim 33 in which M is gallium.

47. A catalyst as in claim 46 in which $R'_1$ and $R''_2$ are alkyl radicals.

48. A catalyst as in claim 47 in which said organometallic compound comprises triethyl gallium.

49. A catalyst as in claim 28 in which said chromate ester comprises a hindered ditertiary polyalicyclic chromate ester.

50. A catalyst as in claim 49 in which said chromate ester comprises a compound which has the structure

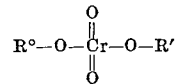

wherein R° and R' are similar or dissimilar hindered polyalicyclic groups which contain two or more saturated rings which are sterically hindered by the presence of bridged ring structures.

51. A catalyst as in claim 50 wherein R° and R' are the same polyalicyclic groups.

52. A catalyst as in claim 51 wherein R° and R' are adamantyl groups.

53. A process for improving the productivity, as an ethylene polymerization catalyst, of silicon dioxide supported chromate ester catalyst, which consists essentially of reducing said catalyst with about 2 to 16 mols of organometallic compound reducing agent per mol of said chromate ester compound at a temperature of from about 50° C. up to the decomposition temperature of said chromate ester so as to provide the reduced chromium atoms in the composite catalyst with an average valence of $\geq 2.0 < 4.0$, said reducing agent having the structure $$M(R'_1)_a(R''_2)_b$$

wherein

M is a metal selected from the group consisting of aluminum, magnesium and gallium, $R'_1$ is a $C_1$ to $C_{20}$ hydrocarbon radical, $R''_2$ is $R_1$ or H, $a$ is a whole number of 1 to 3, inclusive, and $b$ is a whole number of 0 to 2, inclusive, with the proviso that $a+b=$ the valence of M.

54. A process as in claim 53 wherein said chromate ester comprises silyl chromate ester.

55. A process as in claim 54 wherein said silyl chromate comprises a compound which comprises at least one group of the structure

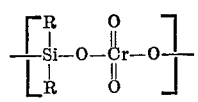

wherein R is a $C_1$ to $C_{14}$ hydrocarbon radical.

56. A process as in claim 55 in which about 2 to 16 mols of said reducing agent are used per mol of said chromate ester at a temperature of from about 125° to 150° C.

57. A process as in claim 56 in which R is an aryl radical.

58. A process as in claim 57 in which said silyl chromate ester is a bis-triaryl silyl chromate.

59. A process as in claim 58 in which said silyl chromate ester is bis-triphenyl silyl chromate.

References Cited

UNITED STATES PATENTS

| | | | |
|---|---|---|---|
| 3,324,095 | 6/1967 | Carrick et al. | 260—94.9 |
| 3,324,101 | 6/1967 | Baker et al. | 260—94.9 |
| 3,493,554 | 2/1970 | Rekus | 260—94.9 |
| 2,886,561 | 5/1959 | Reynolds et al. | 260—94.9 |

JOSEPH L. SCHOFER, Primary Examiner

F. J. SMITH, Assistant Examiner

U.S. Cl. X.R.

252—431 R; 260—80.78, 85.3, 88.2, 93.7